P. BECKER.
GAS COCKS.
No. 184,573.  Patented Nov. 21, 1876.
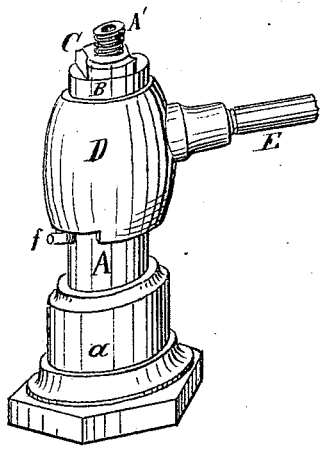
Fig: 1
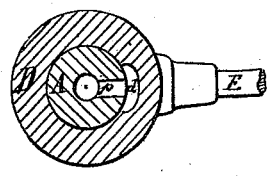
Fig: 3
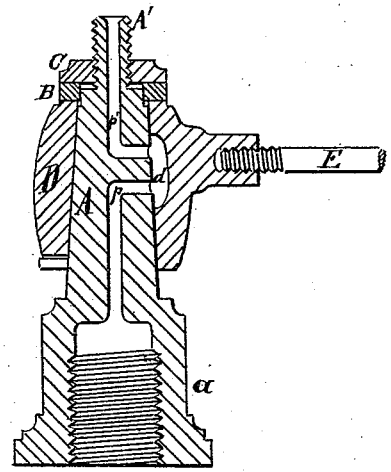
Fig: 2
Witnesses  Peter Becker  Inventor
L. H. Seely
B. N. Dyer  By  Geo. W. Dyer & Co.
Attorneys

UNITED STATES PATENT OFFICE.

PETER BECKER, OF CHICAGO, ILLINOIS.

IMPROVEMENT IN GAS-COCKS.

Specification forming part of Letters Patent No. 184,573, dated November 21, 1876; application filed October 12, 1876.

*To all whom it may concern:*

Be it known that I, PETER BECKER, of Chicago, in the county of Cook and State of Illinois, have invented a new and Improved Gas-Cock, which is fully set forth and described in the following specification, reference being had to the accompanying drawing.

My invention relates to that class of gas-cocks which are particularly designed for use on street-lamps; and it consists in the peculiar construction of the same, as more fully hereinafter described.

In the drawing, Figure 1 represents a perspective view, Fig. 2 a vertical section, and Fig. 3 a transverse section, of my gas cock.

The stationary part of this gas-cock consists of a conical or tapering stem, A, the bottom of which ends into a socket, $a$, screw-threaded on its inner surface to be coupled to the end of a gas-pipe, while its top is squared for a washer, B, and terminates in a screw, A', for securing a nut, C, and the burner. The axis of the stem A is bored out from both ends to near the middle, where two holes are bored on a line from the periphery of the stem to its axis, thus forming two L-shaped ports, $p$ and $p'$, which are interposed by a partition of solid metal. A sleeve, D, bored tapering so as to inclose the tapering stem perfectly tight, and held by the washer B and nut C, has on its inner surface an oblong cavity, $d$, which, if turned in line with the port-outlets, will form a connection between them, and will permit the gas to pass from one port, $p$, into the other port, $p'$; but if turned away from the ports the gas will be shut off. The sleeve D is operated by a handle, E, screwed into a boss on sleeve D. A pin, $f$, secured into tapering stem A, acts as a stop for the turning motion of the sleeve D in either direction, the lower edge of the sleeve D being cut away part of a circle, so as to form two shoulders to butt against said pin in shutting or opening the cock.

The advantage of this cock over others is, that it can be operated easily from below, and that it will keep tight better, as the sleeve, by its own weight, will follow the increasing diameter of the tapering stem while it wears.

What I claim as my invention is—

A gas-cock consisting of a stationary tapering stem, A, having ports $p$ and $p'$, and of a tapering bored sleeve, D, having a cavity, $c$, to operate in the manner substantially as described and shown.

PETER BECKER.

Witnesses:
   WM. H. LOTZ,
   EMIL H. FROMMANN.